United States Patent [19]

Freitag

[11] Patent Number: 4,840,763
[45] Date of Patent: Jun. 20, 1989

[54] METHOD FOR THE PRODUCTION OF REINFORCED COMPOSITES

[75] Inventor: Douglas W. Freitag, Arlington, Tex.

[73] Assignee: LTV Aerospace and Defense Company, Dallas, Tex.

[21] Appl. No.: 82,433

[22] Filed: Aug. 6, 1987

[51] Int. Cl.⁴ ............................................. C04B 33/28
[52] U.S. Cl. ........................................ 264/65; 264/56; 264/86; 264/87; 501/95
[58] Field of Search ................... 264/56, 86, 87, 65; 501/95

[56]  References Cited
U.S. PATENT DOCUMENTS

| | | | |
|---|---|---|---|
| 2,311,588 | 2/1943 | Denning | 264/87 |
| 3,833,389 | 9/1974 | Komeya et al. | |
| 4,507,224 | 3/1985 | Toibana et al. | |
| 4,543,345 | 9/1985 | Wei | |
| 4,560,668 | 12/1985 | Hunold et al. | |
| 4,652,413 | 3/1987 | Tiegs | |
| 4,693,857 | 9/1987 | Komeya et al. | 264/86 |
| 4,737,326 | 4/1988 | Wirth et al. | 264/87 |

FOREIGN PATENT DOCUMENTS

| | | | |
|---|---|---|---|
| 59-54680 | 3/1984 | Japan | 501/95 |
| 2165230 | 4/1986 | United Kingdom | 501/95 |

OTHER PUBLICATIONS

Kirk–Othmer, Encyclopedia of Chemical Technology, 3rd Edition, John Wiley & Sons 1979, vol. 6, "Composite Materials," pp. 683–700.
Kirk–Othmer, Encyclopedia of Chemical Technology, 3rd Edition, John Wiley & Sons 1979, vol. 19, "Powder Metallurgy," pp. 28–46.
German, R. M., "Liquid Phase Sintering," 1985 Plenum Press, New York, p. 224.

Primary Examiner—James Derrington
Attorney, Agent, or Firm—James M. Cate; Stephen S. Sadacca

[57] ABSTRACT

A process for the production of reinforced refractory composite structures which may be of high density and shaped in desired three dimensional configurations. The shaped composite structures are produced by forming a suspension of particulate materials including a colloidal refractory power, colloidal sintering aid, and refractory reinforcement whiskers in a carrier liquid. The colloidal suspension is conformed to a desired configuration and brought into contact with a semipermeable membrane. A pressure is imposed on the suspension in the desired configuration to expel liquid from the suspension through the membrane to arrive at a green composite having a density of at least 40% of theoretical density. After drying, the green composite is then sintered under conditions to form an intergranular liquid phase in the composite providing further densification. A specific composite is a silicon carbide reinforced silicon nitride composite. The green composite may be sintered to provide a density of at least 93% of theoretical to produce a closed impermeable composite surface. The composite may then be subjected to hot isostatic pressing.

41 Claims, 2 Drawing Sheets

METHOD FOR THE PRODUCTION OF REINFORCED COMPOSITES

TECHNICAL FIELD

This invention relates to the preparation of filament reinforced refractory composites and more particularly to the preparation of such composites in desired configurations by the colloidal shaping and filtration of the composite components in fluid suspension followed by sintering.

ART BACKGROUND

There are various procedures known in the prior art for the preparation of refractory composite structures which are resistant to degradation through oxidation or applied thermal and mechanical stresses or under severe temperature conditions. Such refractory structures can incorporate the use of metal powders such as those used in powder metallurgy processes, ceramic powders and mixtures of ceramic and metal powders commonly referred to as ceramals and cermets. Such products are employed in high temperature environments up to 3000° F. and even beyond as components in turbine engines and heat exchangers. They are also used in low temperature structures requiring characteristics such as high strength/weight ratios, high corrosion resistance, high erosion resistance, and high dielectric capacities. Such materials find uses in the electronics industry and in various bearing applications.

Procedures used in formulating ceramic composite structures include manufacturing processes involving cold or hot isostatic pressing, uniaxial hot pressing, injection molding, slip casting, and sintering procedures, which may or may not include liquid phase sintering. Various materials may be employed in producing refractory composites. For example U.S. Pat. No. 3,833,389 to Komeya et al discloses a composite which is reinforced by an inner fabric structure and which is derived from a multicomponent mixture comprising one or more ceramic powders. In Komeya et al, the heat resistant composite is formed from a three component mixture. The first component is aluminum nitride or silicon nitride or mixtures thereof. The second component is an oxide of lanthanum, cerium, scandium, yttrium, and/or yttrium aluminum garnate. The third component is silicon carbide, boron nitride, or carbon or mixtures thereof. The three components are mixed and then hot press sintered in a nonoxidizing environment. Komeya et al contemplate the use of fibers, for example, silicon carbide whiskers, and also binders such as steric acid which can be decomposed or otherwise vaporized out of the system during the sintering procedure.

U.S. Pat. No. 4,507,224 to Toibana discloses composite structures of high electroconductivity characterized in the patent as ceramics A and B. The A materials are based upon a matrix phase of oxides of Group II, Group III and Group IV elements which are reinforced with crystal whiskers of silicon carbide. The group B ceramics may have a matrix phase formed of the above oxides or alternatively nitrides and/or carbides of Group II, III or IV elements and also electroconductive carbides, nitrides and borides. Sintering aids which may be used include magnesia, alumina, and yttria. The materials used in forming the composite are formed into a pasty mixture which is molded to a desired shape by injection molding or extrusion and dried at temperatures up to 600° C. and then fired at temperatures ranging from about 1300°–1800° C. for the A materials and 1200°–2000° C. for the B materials.

U.S. Pat. No. 4,543,345 to Wei discloses a ceramic composite and its method of preparation in which monocrystalline silicon carbide whiskers are used to reinforce the composite material based upon refractory matrix powders such as $Al_2O_3$, $3Al_2O_3.2SiO_2$, and $B_4C$. The silicon carbide whiskers are characterized as having an average diameter of 0.6 microns, a length of 10–80 microns, and an average aspect ratio (the ratio of whisker length to whisker diameter) of 75.

Wei discloses two general procedures for forming the composite. The first to produce a product in which the whisker orientation is in a plane orthagonal to a pressing axis is exemplified by the procedure in which fine ceramic powders (0.5–1.0 micron) and silicon carbide whiskers are mixed in hexane and then agitated in a blender followed by dispersion in an ultrasonic homogenizer. The resulting mixture is dried and then hot pressed to a density of more than 99% of theoretical density. Hot pressing is carried out at temperatures of 1600° to 1950° C. and pressures of 28–70 MPa. An alternative to the use of hexane as a solvent in this procedure is distilled water which is removed by freeze drying prior to the hot pressing step. An alternative procedure designed to achieve omnidirectional whisker orientation involves isostatic hot pressing. Here the pressures and temperatures applied to the mixture in a tantalum can in a high temperature inert-gas autoclave are in the some ranges as those employed in the uniaxial pressing procedures.

U.S. Pat. No. 4,560,668 to Hunold et al discloses the production of shaped composites based upon mixtures of polycrystalline silicon nitride and polycrystalline silicone carbide powders having particle sizes up to 10 microns. The particulate mixture is mixed with a temporary binder and dispersed in a solution of a solvent such as acetone or a $C_1$–$C_6$ aliphatic alcohol and then shaped by known technique such as die pressing, isostatic pressing, injection molding, extrusion molding or slip casting. After the shaping procedure, which is carried out at room temperature or above, the shaped green composite is heated to a temperature from 300° to 1200° C. prior to an encapsulated isostatic hot pressing procedure. The thermotreatment is employed in order to ensure that gaseous decomposition products from the binders do not interfere or damage the casing employed in the hot isostatic pressing process. The composite materials enclosed within a suitable casing such as tungsten, glass, etc. are heated in a high pressure autoclave at temperatures within the range of 1800°–2200° C. at pressures of from 100 to 400 MPa.

U.S. Pat. No. 4,652,413 to Tiegs discloses a process for producing silicon carbide whisker reinforced refractory oxide composites in which pressureless liquid phase sintering is followed by hot isostatic pressing. In this procedure, a mixture of a particulate matrix powder such as $Al_2O_3$, $3Al_2O_3.2SiO_2$, $B_4C$ is mixed with about 5–60 volume percent of SiC whiskers of about 0.6 microns in diameter and about 10–80 microns in length. Specifically disclosed in Tiegs is a mixture of alumina powder in the size range of about 0.1–1 micron, about 0.5 to 5 wt. % of yttria in the size range of about 1 to 3 microns as a liquid phase sintering aid and about 5 to 10 volume percent silicon carbide whiskers. The components are mixed and then subjected to wet milling in a ball mill operation for a period of about ½ to 8 hours. This mixture is then pressed in a suitable mold under a pressure of 10,000 to 60,000 psi to at least 50% of theoretical density and is then subjected to a pressureless liquid phase sintering procedure at a temperature of 1800° C. in an inert gas atmosphere provided by argon, nitrogen or helium. The resulting product is then subjected to a hot isostatic pressing in an argon atmosphere at a pressure of 10,000 to 30,000 psi and a temperature of 1600°–1700° C.

DISCLOSURE OF THE INVENTION

The present invention provides a new and improved process for the preparation of reinforced refractory composites which may be of high densities and shaped in desired three dimensional configurations, but which do not require high pressure sintering although the sintering step of the present invention can be carried out under elevated pressures, if desired. In addition, isotropic, as well as anisotropic whisker orientation can be imparted to the composite without employing encapsulation procedures during sintering such as in the case of hot isostatic pressing, as disclosed, for example, in the aforementioned patent to Hunold et al. In contrast with the sintering pressures of 10,000 psi to more than 100,000 psi required in such hot pressing techniques, the sintering operation of the present invention can be carried out at relatively low pressures of only a few hundred psi or even at atmospheric or near atmospheric pressure.

In carrying out the invention, a suspension of a three component particulate mixture is formed in a carrier liquid, which may be either aqueous or nonaqueous. The particulate materials comprise a colloidal refractory powder, a colloidal sintering aid and refractory reinforcing whiskers. It usually will be preferred to incorporate a dispersing agent in the carrier liquid in order to aid in dispersion of the particulate materials. Typically such dispersing agent will take the form of a surfactant which reduces the particulate surface-liquid interfacial tension and increases the wettability of the particulate surfaces to the carrier liquid.

The suspension of the particulate materials is conformed to a desired configuration and brought into contact with a semipermeable membrane; i.e., a filter structure which will allow the passage of solvent but which is substantially impermeable to the colloidal particulate materials. While the suspension is retained in the desired configuration, a pressure is imposed thereon to expell liquid from the suspension through the membrane. The pressure is sufficiently high and is maintained for a sufficient period of time to arrive at a green composite shaped in the desired configuration and which has a density equal to of at least 40% and preferably at least 45% of theoretical density of the composite. The green composite is then subjected to drying to dehydrate the composite of the remaining solvent and thereafter sintered in a nonoxidizing atmosphere at a temperature sufficient to form an intergranular liquid phase in the composite. At the conclusion of the sintering step the composite is allowed to cool. The resultant product can be produced to have a density of at least 90% of theoretical density.

Where a dispersing agent is employed in formulating the suspension, it is preferred to heat the dried composite to a temperature well below the sintering temperature but at a value sufficient to evolve the dispersant, e.g., by thermal decomposition, from the dried composite.

Preferably the maxtrix and sintering aid powders are truncated by a classification procedure to eliminate particulates having a diameter in excess of 1 micron. The whiskers desirably are of a diameter of no more than 1 micron and more preferably have an average diameter which is no greater than the average diameter of the ceramic powder. It is also preferred that the colloidal suspension comprise at least 20 volume percent of the particulate materials including the whiskers.

A preferred application of the invention is in the preparation of silicon carbide reinforced silicon nitride ceramic composite structures. In this case, the initially formed suspension comprises colloidal size silicon nitride powder and silicon carbide reinforcing whiskers. Preferably the sintering aids employed in the suspension are colloids selected from the group consisting of yttria, alumina, magnesia, silica, zirconia and mixtures thereof. An especially suitable sintering aid is a mixture of yttria and alumina in which the yttria is present in an amount greater than the alumina. Other preferred sintering aids include mixtures of magnesia, silica and yttria with the alumina being present as a minor component relative to the other sintering materials. It is also preferred that the sintering aid be present in an amount of at least 5 wt. % of the silicon nitride in order to provide for the formation of a relatively large intergranular liquid phase during the sintering operation. For yttria based sintering aids, such as mixtures of yttria and alumina as described above, it is preferred that the sintering aid be present in an amount or at least 10 wt. % of the silicon nitride matrix material.

DETAILED DESCRIPTION OF THE INVENTION

As disclosed in the aforementioned patents to Komeya, Toibana, Wei, Hunold and Tiegs there are various refractory powders which may be employed as matrix materials in composite structures and such materials which are subject to liquid phase sintering may be employed in formulating composites in accordance with the present invention. However the invention is particularly applicable to the preparation of high density, high performance composite structures. Refractory powder materials particularly useful in the formulation of such structures include aluminum oxide, aluminum nitride, silicon nitride, silicon dioxide, magnesium dioxide, and zirconium dioxide with silicon nitride being especially preferred.

It is well known in the art that reinforcing filaments can be embedded into the refractory matrix material to strengthen the composite structures and increase their resistance to such factors as abrasive and thermal stresses. The reinforcing filaments can be randomly or directionally oriented depending upon the desired properties of the product. The use of such reinforcing filaments to impart desired characteristics to the composites are disclosed in Kirk-Othmer, Encyclopedia of Chemical Technology, Third Edition, John Wiley & Sons 1979, Volume 6, "Composite Materials" pages 683-700. In the case of high performance ceramic composites, monocrystalline whiskers are the reinforcing filaments of choice since they are not subject to the recrystallization or crystal breakdown reactions associated with polycrystalline or amorphous fibers at the processing temperatures involved. Extremely high performance whiskers include those formulated from silicon carbide, silicon nitride, magnesium oxide, aluminum oxide, and boron carbide.

The use of sintering aids is also well known in the art, as evidenced by certain of the aforementioned patents. Liquid phase sintering is particularly discussed in U.S. Pat. No. 4,652,413 to Tiegs and also in Kirk-Othmer, Vol. 19, pages 28-46, under the heading "Powder Metallurgy". In liquid-phase sintering, a transitional melt phase is formed between the solid particulate ceramic surfaces which, upon cooling, results in a relatively high density product. Stated otherwise, the liquid transitional melt phase promotes densification of the composite materials. The liquid melt phase forms as a result of reduced melting point systems which can be analogized to eutectic forming alloy systems.

In addition to the refractory matrix materials noted above, various other matrix materials may be employed in carrying out the invention. Such systems include materials based upon beryllium-silicon, magnesia or tungsten based powders and titanium alloy powders. For a further description of matrix powders and sintering aids which may be used in producing high performance composites by means of liquid phase sintering reference is made to German, R. M., "Liquid Phase Sintering," Plenum Press, New York, 1985 and particularly the material presented on page 224 thereof.

While the invention is of broad application in the production of filament reinforced refractory composites, it is especially useful in forming silicon carbide reinforced silicon nitride composite structures of the high-density, high-performance type, the production processes of which have heretofore involved high pressure autoclave equipment. In addition, while the invention may be employed in the production of composites having directionally aligned reinforcing whiskers, it is especially well suited to the production of products having isotropic whisker orientation. Accordingly, the invention will be described initially with respect to the preferred embodiment in which silicon carbide reinforced silicon nitride composites having isotropic whisker orientation are formed.

In carrying out the invention, a colloidal suspension of a three component mixture of particulate materials is formed in a suitable carrier liquid. By the term colloidal suspension as used herein is meant a liquid dispersion of particulates which is between a true molecular solution on the low end (in terms of particle size) and a mechanical suspension where significant sedimentation due to gravity would occur during the isostatic compression process, on the high end. While characterization of the colloidal state in terms simply of particulate size is somewhat arbitrary, it is generally accepted in the art, that colloids include the millimicron to micron size range for at least one significant particle dimension. As a practical matter, the present invention is applicable to systems in which the matrix particles are no greater than about 5 microns and preferably no greater than 1 micron, as will appear hereinafter. The carrier liquid may be an aqueous liquid, e.g., distilled water, or it may be a nonaqueous liquid such as ethanol, isopropyl alcohol, or a light hydrocarbon solvent such as hexane. Additives to increase the viscosity of the carrier liquid and enhance its ability to hold the particulates in suspension may be employed, but usually will be unnecessary particularly where, as is preferred, the silicon nitride powder and the sintering aid material are truncated to eliminate particles which are greater than one micron. The use of a relatively high solids fraction in the suspension in accordance with the present invention also inhibits particulate segregation from the suspension. It is, however, highly desirable to incorporate a dispersing agent, typically an anionic surfactant, into the carrier liquid in order to facilitate dispersion of the particulate materials without agglomeration. While it is particularly important to ensure that the silicon carbide whiskers are well dispersed, such agents also aid in facilitating dispersion of the silicon nitride powder and the sintering aid material. The dispersing agent may be added to the carrier liquid prior to the particulates or it may be mixed with the particulates and added to the carrier liquid concomitantly with the particulate materials.

Surface active agents suitable for use as dispersants in nonaqueous liquids such as alcohols and the like include Tamol 731, a sodium salt of a polymeric carboxyalic acid, available from Rhom & Haas Co. A suitable surface active agent for use in an aqueous liquid is Darvan C, an ammonium of a carboxylated liquid polyelectrolyte available from R.T. Vanderbilt Company.

In the preferred embodiment employing silicon nitride and silicon carbide, it is desirable to use a nonaqueous carrier liquid in order to avoid modification of the silicon nitride surfaces to produce silicon surfaces through interaction with water. In this respect, some surface silica is required for the liquid phase sintering reaction. Typically, a commercially available silicon nitride powder contains about 1-5 wt. % of oxygen. If water is used, the shaping process described below should take place immediately after formation of the suspension.

Commercial silicon nitride powder and sintering aid powders of magnesia, yttria, silica, alumina and the like in which the particulates are predominantly in the colloidal size range are readily available. Often such materials will contain minor amounts, typically within the range of 10-20%, of granules of sizes greater than one micron. Preferably, these commercially available materials are classified to remove and discard particle sizes greater than one micron.

For a given system, the amount of sintering aid material determines the volume of the intergranular liquid phase. The optimum, in terms of achieving an ultimate final density of at least 93% of theoretical density, as preferred, normally requires about 5-15 wt. % sintering aid expressed as a percentage of the matrix powder materials.

Figure 1:
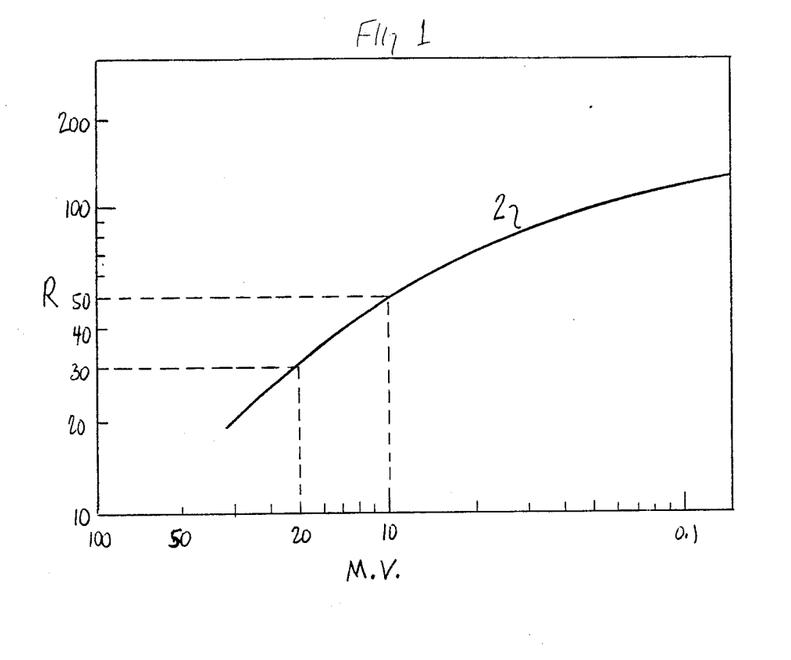
FIG. 1 is a graph illustrating a desired relationship between aspect ratio and whisker concentration in silicon carbide reinforced silicon nitride composites.

The amount of silicon carbide whiskers employed in the particulate mixture is determined by the average aspect ratio (the ratio of the whisker length to the whisker diameter) of the whiskers. In general, the maximum amount of reinforcing whiskers which can be incorporated into the particulate mixture, while still arriving at a product of the requisite high density, decreases as the aspect ratio increases. This relationship is shown in FIG. 1 in which curve 2 is a log-log graph of the whisker aspect ratio, R, plotted on the ordinate versus the maximum whisker volume, MV, expressed as a volume percent of the total particulates content on the abscissa. As illustrated by the broken line ordinate values if the mean whisker aspect ratio is 50, no more than 10 volume percent whiskers can be incorporated into the particulates. If the aspect ratio is reduced to 30, up to 20 volume percent whiskers can be incorporated. Preferably the average value of the aspect ratio of the whiskers is no greater than 30 and more preferably no greater than 20 in order to provide for the incorporation of substantial quantities of reinforcing whiskers into the composites.

Commerically available silicon carbide whiskers sometimes have aspect ratios substantially above those called for in the preferred embodiment of the present invention. In order to provide for an average aspect ratio conforming with the relationship shown in FIG. 1, the silicon carbide whiskers may be subjected to a ball billing operation in order to arrive at a reduced whisker length providing the desired aspect ratio. Even where the available whiskers have an aspect ratio in the range of 20–30, ball milling is still desirable in order to remove whisker "nests." It is also preferred that the silicon nitride and sintering aid matrix powders are classified so that the maximum particle size is no greater than the average silicon carbide whisker diameter. Thus, where the average whisker diameter is about one micron, classification as described above to remove particles of greater than one micron is adequate. However where smaller diameter whiskers are employed, e.g., of 0.5 microns, it will be preferred to classify the matrix powders in order to remove particles of those materials having a size greater than 0.5 microns.

The three component particulate system preferably is added to the carrier liquid in an amount of at least 20 volume % in order to avoid segregation of the reinforcing whiskers and matrix powders during the subsequent shaping operation. More desirable the colloidal suspension comprises at least 30 volume percent particulates and greater amounts of particulates can be advantageously employed so long as the rheology of the suspension is consistent with flowing the suspension into the filtration chamber where it is shaped and colloidal filtration takes place. That is, the quantity of particulates should be limited so the suspension does not reach the point where it becomes so "stiff" that it is not flowable. This limit will vary depending upon the nature of the particulates and the carrier liquid, dispersing agent used and viscosity enhancers, if any, employed in the carrier liquid. As a practical matter, it usually will be desirable to provide that the carrier liquid itself forms at least 50 volume percent of the suspension i.e. the solids content is no more than 50 volume percent.

The solids content of the colloidal suspension influences the orientation of the whiskers at the conclusion of the collodial filtration step when an isostatic compression technique is used as described below. The greater the solids content, the greater the tendency for retention during the filtration process of the isotropy formed during the blending procedure. Particulates contents of 40% or more can usually be achieved without adversely affecting the rheology of the suspension and at this content, complete retention of the isotropy is assured. As a practical matter, a solids content of at least 30 volume percent will result in a satisfactory isotropic orientation of the whiskers. At the 20 volume percent particulate level a directional whisker orientation along the filter axis may appear. This will become progressively more pronounced as the particulates content is reduced below the 20 percent volume.

Figure 2:
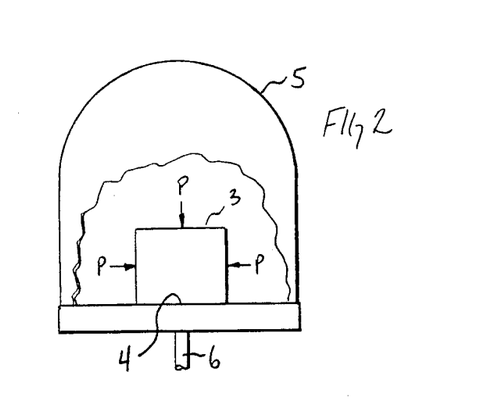
FIG. 2 is a schematic illustration of an isostatic filtration press which may be employed to provide isotropic whisker orientation.

The suspension of particulate materials is then shaped to the desired configuration and subjected to a colloidal filtration step. FIG. 2 is a schematic illustration of one form of a pressing mechanism used to impose isostatic pressure on the suspension to arrive at a composite with isotropic whisker orientation.

With reference to the isostatic filtration press shown schematically in FIG. 2, the colloidal suspension is placed in a suitable die chamber 3 which is of the desired configuration for the final composite structure. For example, as shown in FIG. 2, the die chamber 3 is cylindrical in configuration. However, it may be of any desired three dimensional configuration including shapes, comprising complex flat or curved surfaces. A portion of the die chamber is defined by a semipermeable membrane 4 which is permeable to the alcohol or other liquid used in forming the particulate suspension but which is substantially impermeable to the colloidal matrix powders and, of course, the whiskers. The membrane 4 typically may take the form of a paper filter structure having interstitial pores of from 100 to several hundred angstroms in diameter and which rests on a suitable permeable support structure (not shown) capable of withstanding the pressure imposed upon the solution within the die chamber. The die chamber including the membrane structure is enclosed within a pressure vessel 5 within which fluid pressure is imposed isostatically as indicated by arrows P upon the particulate suspension within the die chamber. Pressure is imposed upon the die chamber for a period of time to expel liquid from the suspension through the semipermeable membrane to arrive at a shaped green composite structure.

The carrier liquid expelled from the particulate suspension drains to a reservoir (not shown) below the membrane 4 and is withdrawn from the isostatic pressing mechanism via a conduit 6. Sufficient liquid is expelled to arrive at a formed density of the green composite (expressed as a percentage of theoretical density) of at least 40%. Preferably, the density of the green composite is at least 45% of theoretical density in order to ensure that the product retains its desired shaped configuration during processing such as machining and the like which may be performed prior to the sintering step. As a practical matter, densities of at least 50% of theoretical density can readily be achieved during the isostatic compression step and in some cases the density may range up to about 60% of theoretical.

The isostatic filtration pressure and the duration during which it is imposed will vary depending upon the initial particulates content of the suspension, the nature of the particulates, and the nature of the carrier liquid. As a general rule, the pressure imposed upon the suspension normally will be within the range of 1000–5000 psi and the filtration time will be within the range of 30–120 minutes. Similar considerations apply in the case when anisotropic filtration pressurization is used to provide for anisotropic orientation of the whiskers. In either case, the pressures used will be well below those normally encountered in dry pressing techniques, i.e., pressures well above 10,000 psig usually in the range of 30,000–100,000 psig, since the carrier liquid acts as a "lubricant" between the solid particulates, aiding in compaction. Lower pressures are desirable in the production of the whisker reinforced ceramic products in order to avoid imparting whisker damage which is sometimes associated with high pressure dry pressing operations. Accordingly it is preferred to carry out the colloidal filtration step at a pressure less than 7,000 psi.

The isostatic filtration operation may be described as a "cold" isostatic pressing operation since it normally will be carried out under ambient temperature conditions. In some cases it may be desirable to employ modestly elevated temperatures, for example, to reduce the viscosity of the carrier liquid during the filtration process, but the temperature should, in any event, be below the boiling point of the carrier liquid. The procedure cannot in any sense be characterized as a hot isostatic pressing operation.

For a further description of an isostatic filtration press and procedure for accomplishing the colloidal filtration step isostatically, reference is made to applicant's copending application Ser. No. 082,431, entitled "Method and Apparatus for Producing Structures by Isostatic Compression," filed on even date herewith, the entire disclosure of which is incorporated by reference.

At the conclusion of the filtration process, the preformed green composite structure is shaped to the desired configuration but still retains a substantial liquids content, normally within the range of 30–50 volume percent. The green composite is dried by any suitable technique prior to the sintering operation. Where water is employed as a carrier liquid, freeze drying can be used. However, it usually will be preferred when using either water or a nonaqueous liquid as the carrier to dry the composite under forced air circulation at a moderately elevated temperature, for example, about 90°–95° C. in the case of water or isobutyl alcohol. The drying temperature should in any case be below the boiling point of the carrier liquid in order to prevent disruption of the composite by boiling of liquid within the green composite.

After the drying step and where a surfactant is employed as a dispersing agent, the composite is heated to an elevated temperature which is well below the sintering temperature but which is sufficient to drive off the surfactant by thermal decomposition. This procedure will normally involve heating the composite at a temperature within the range of 300°–600° C. for a period of about 60–240 minutes.

Sintering of the dried green composite is carried out in a nonoxidative atmosphere in a manner which will be readily understood by those skilled in the art. In the case of the silicon nitride system as described herein, the sintering step should be carried out under a nitrogen atmosphere. For other systems, the non-oxidative environment may be provided by argon, helium, or by pulling a vacuum on the sintering chamber. The temperature at which the sintering operation is carried out depends upon the nature of the particulates in the composite. In the silicon carbide reinforced silicon nitride system preferred for use herein, the thermal decomposition of silicon nitride imposes a limit on the sintering temperature at about 1650° C. or above. In this respect, the limit on the sintering temperature of silicon nitride is indicated by the following reaction.

$$Si_3N_4 + 3SiO_2 \rightleftharpoons 6SiO + 4N_2 \tag{1}$$

At one atmosphere of nitrogen the limiting temperature is about 1650° C. In order to increase the sintering temperature above this value the effective nitrogen pressure can be increased. The effective nitrogen pressure on the composite can be increased globally or locally, the latter the result of a sintering buffer placed around the sample during sintering. As indicated by reaction (1), an increase in nitrogen will drive the reaction to the left, thus permitting a higher sintering temperature.

Figure 3:
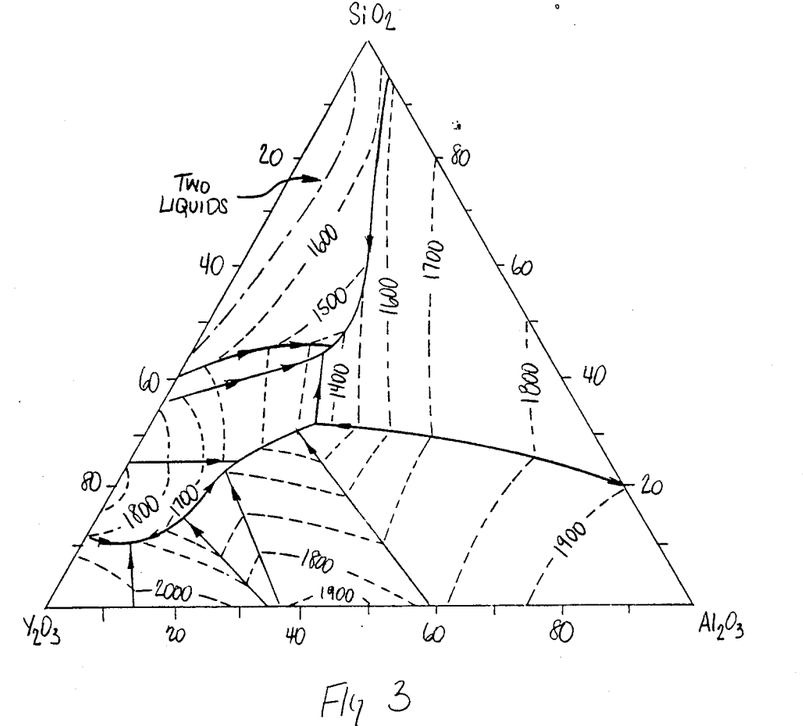
FIG. 3 is a sintering aid phase diagram.

For the system employing a sintering aid comprising a mixture of yttria and alumina, the sintering temperature can be determined in accordance with the phase diagram of the yttria-alumina-silica melting point system as shown in FIG. 3.

FIG. 3 is a ternary phase diagram for the yttria-alumina-silica system with isotherms incremented at 100° C. shown by broken lines. The silica may be due to surface silica on the silicon nitride matrix powder or it may include silica added as a sintering aid. As indicated in FIG. 3, the minimum temperature necessary to achieve an equilibrium melt phase is about 1400° C. or slightly less. The maximum temperature for this particular system will, as indicated above, be dictated by the decomposition temperature of the silicon nitride. As will be understood by those skilled in the art, phase diagrams for various other matrix-sintering aid systems can be developed and for a disclosure of such phase diagrams reference may be had to "Phase Diagrams for Ceramists," American Ceramic Society, 1969.

The sintering operation may be carried out under essentially "pressureless" conditions although usually it may be desirable to employ a positive pressure, for example, at least 5 psig, in order to ensure the maintenance of a nonoxidative atmosphere in the sintering furnace. It may be advantageous in terms of arriving at good surface finishes for the composite product to carry out the sintering operation at pressure ranging up to about 1000 psig. For example, in the preferred silicon nitride, silicon carbide system, a nitrogen over pressure within the range of 100–200 psig may be employed in order to ensure the formation of a smooth surface finish. Higher pressures can be used, but are unnecessary, and for reasons of economy the pressure should be limited to 1000 psig. The sintering process is in any case carried out at pressures well below those called for in processes such as hot isostatic pressing, where pressures in excess of 10,000 psig are employed.

In carrying out the sintering operation, the dried preformed composite is placed in a furnace in a crucible formed of a suitable refractory material such as graphite. The preform may and usually will be, surrounded by a particulate buffering agent which is packed in the crucible around the preform. In one embodiment of the invention in which the sintering operation is carried out at atmospheric or near atmospheric pressure, the buffer is comprised of at least some of the materials used in forming the ceramic matrix. Thus, for the preferred silicon nitride-silicon carbide system described herein, the buffer should include particulate silicon nitride plus a sintering aid material which, while it may be different than the sintering aid used in the preform, preferably will be formulated of the same material. In some instances in order to ensure the formation of a good surface finish at low sintering pressures the buffer will contain the same ceramic powder and sintering aid materials as used in the composite in the same relative amounts. Where the preform is sintered under a nitrogen over-pressure condition, the use of a buffer is still advantageous in preventing sintering aid migration.

By way of an example illustrating the practice of the present invention, a matrix powder was formulated of silicon nitride to which was added a sintering aid comprising a mixture of yttria and alumina to provide a mixture comprising 93% wt. percent silicon nitride, 4 wt. % yttria and 3 wt. % alumina. The matrix powders were treated by a centrifugal classification technique to remove particles greater than one micron. The silicon carbide whiskers were ball milled to reduce the whisker aspect ratio and those whiskers having an aspect ratio of greater than about 50 were removed from the whiskers. The average whisker diameter was about one micron. In order to conform with the relationship shown in FIG. 1, the whiskers were added to the matrix powders to provide a mixture comprising 10% volume percent whiskers and 90 volume percent powders. The particulate mixture was then blended into a carrier liquid (ethyl alcohol containing 1.0 wt. % Tamol 731 as a dispersant) by a wet milling operation. The resulting suspension contained about 20 volume percent particulates (including whiskers) and 80 volume percent alcohol. The suspension was placed in the die chamber of an isostatic filtration press and subjected to colloidal filtration under an applied pressure of 5,000 psig for a period of 90 minutes. About 36% of the liquid in the suspension was expelled by the colloidal filtration process resulting in a green preformed composite structure having a form density expressed as a percent of theoretical density of 48.8%. The preform was removed from the filtration press and dried by forced air circulation at a temperature of 90° C. for 24 hours. At the conclusion of the drying step, the preform was heated at a temperature of about 400° C. for about 240 minutes in order to remove the surfactant.

The preformed composite structure was then coated with a layer of boron nitride by spraying with a slurry of boron nitride in isopropyl alcohol. The structure was allowed to dry and then placed in a graphite crucible where it was surrounded with a particulate buffer comprising 4% wt. % yttria, 3 wt. % alumina, 53 wt. % silicon nitride and 40 wt. % boron nitride.

The sintering step was then carried out at a temperature of 1750° C. for a period of two hours. Sintering was performed under nitrogen at a pressure of one atmosphere (14.7 psig). The resulting product was then removed from the crucible and found to exhibit a final density of 93.2% of theoretical density.

It is preferred in carrying out the invention to arrive at a final density of at least 93% of theoretical in order to provide for a subsequent treatment involving hot isostatic pressing as described below. Table I sets forth the results using various sintering aids and sintering conditions to arrive at a final density of at least 93%. In each case the sintering step was carried out at a under a nitrogen pressure of one atmosphere and the sintering was conducted in a graphite crucible employing a buffer formed of silicon nitride, the sintering aid materials in approximately the proportions used in the composite structure, and boron nitride. In Table I, the results of the above example are shown in Run No. 1. Runs 2, 3, 4 show the results employing other sintering aids.

TABLE I

| Run | Sintering Aid | Sintering Conditions | SiCw (v %) | Preform Density Pg/Pth (%) | Final Density Pf/Pth (%) | WW (%) |
|---|---|---|---|---|---|---|
| 1 | 4 w % Y$_2$O$_3$ 3 w % Al$_2$O$_3$ | 1750° C., 2 hours | 10 | 48.8 | 93.2 | +.6 |
| 2 | 10 w % PSZ 1.3% Al$_2$O$_3$ | 1750° C., 1 hour | 10 | 49.5 | 95.5 | −2.3 |
| 3 | 10% Y$_2$O$_3$ 1.3 w % Al$_2$O$_3$ | 1750° C., 1 hour | 20 | 47.6 | 94.6 | +.5 |
| 4 | 4 w % Y$_2$O$_3$ 5 w % SiO$_2$ 1.3 w % Al$_2$O$_3$ | 1650° C., 2 hours | 20 | 46.6 | 93.1 | −1.0 |
| 5 | 5 w % MgO 1.3 w % Al$_2$O$_3$ | 1750° C., 2 hours | 20 | 48.4 | 97.1 | +.7 |

Pf = sintering density
Pg = formed density
PSZ = Yttrium dioxide stablized zirconium dioxide
Pth = theoretical density
SiCw = volume % silicon carbide whiskers
WW = weight change during sintering The silicon carbide whiskers preferably are employed in an amount of at least 10 volume percent of the particulates, indicating that the average aspect ratio be no greater than 50. Where the whisker volume fraction is at least 20 volume percent, the aspect ratio should be no greater than 30.

While, as described above, a final density after sintering 90% of theoretical, is often satisfactory in terms of mechanical and physical properties for the composite structure, a final density of at least 93% of theoretical is preferred in order to facilitate subsequent treatment of the shaped composite by hot isostatic pressing. In this respect, a maximum density of theoretical or near theoretical density, 99+%, can be accomplished by subjecting the sintered composite to a final hot isostatic pressing procedure. By providing a density at the conclusion of the sintering process of at least 93% of theoretical, a closed impermeable surface is provided on the composite so it can be isostatically pressed without the need of an enclosure such as tantalum can or the like as is conventionally used in a hot isostatic pressing. The hot isostatic pressing may be carried out under any suitable pressure and temperature conditions as will be understood by those skilled in the art. The pressure of the hot isostatic pressing procedure will be well above that employed in the liquid phase sintering step and preferably will be at least 10,000 psig. For example, for the silicon nitride system described above, the pressing operation may be cleared out at a temperature within the range of 1500°–1800° C. under an argon pressure of 10,000–25,000 psi for a period of one to two hours. Higher temperatures, up to about 2100° C., can be used for other systems.

Having described specific embodiments of the present invention, it will be understood that modifications thereof may be suggested to those skill in the art, and it is intended to cover all such modifications as fall within the scope of the appended claims.

I claim:

1. In a method for producing a whisker reinforced refractory composite, the steps comprising:
   (a) forming a suspension in a carrier liquid of a mixture of particulate materials comprising a colloidal refractory matrix powder, a colloidal sintering aid and refractory reinforcing whiskers;
   (b) conforming said suspension to a desired configuration and into contact with a semi-permeable membrane;
   (c) retaining said suspension in said configuration while imposing a pressure on said suspension to expel liquid from said suspension through said membrane to arrive at a green composite shaped in said desired configuration and having a density equal to at least 40% of the theoretical density of said composite;
   (d) drying said green composite; and
   (e) thereafter sintering said shaped dried composite under an nonoxidative atmosphere at a temperature sufficient to form an intergranular liquid phase in said composite.

2. The method of claim 1 wherein said colloidal suspension formed in step (a) has a particulate materials content of at least 20 volume %.

3. The method of claim 1 wherein said refractory whiskers are of a diameter no more than one micron.

4. The method of claim 1 wherein said whiskers have a diameter no greater than the average diameter of said refractory powder.

5. The method of claim 1 wherein said suspension contains at least 20 volume % of said particulate materials and at least 50 volume % of said carrier liquid.

6. The method of claim 5 wherein said suspension contains at least 30 volume % of said particulate materials.

7. The method of claim 6 wherein said suspension contains at least 40 volume % of said particulate materials.

8. The method of claim 1 wherein said sintering aid in step (a) is present in an amount of at least 5 wt. % of the colloidal materials in said mixture of particulate materials.

9. The method of claim 1 further comprising incorporating a dispersing agent in said suspension of step (a) to aid in dispersing said particulate materials in said carrier liquid and further comprising the step of, after step (d) but before step (e) of claim 1, heating said dried composite to an elevated temperature sufficient to evolve said dispersing agent from said composite but less than the sintering temperature of step (e).

10. The method of claim 1 wherein step (c) is carried out by isostaticly imposing pressure on said suspension.

11. The method of claim 10 wherein said pressure in step (c) of claim 1 is no more than 7,000 psig.

12. The method of claim 11 wherein said sintering step is carried out at a pressure no more than 1000 psig.

13. The method of claim 1 wherein the concentration of said whiskers in mixture of particulate materials is no greater than the maximum concentration for the average aspect ratio of said whiskers as indicated by FIG. 1.

14. The method of claim 13 wherein said whiskers have an average aspect ratio of no more than 30.

15. The method of claim 1 wherein said refractory matrix powder is selected from the group consisting of aluminum oxide, aluminum nitride, silicon nitride, silicon dioxide, magnesium dioxide, zirconium dioxide and mixtures thereof.

16. The method of claim 15 wherein said refractory reinforcing whiskers are selected from the group, consisting of silicon carbide, silicon nitride, magnesium oxide, aluminum oxide, boron carbide and mixtures thereof.

17. In a method for producing a silicon carbide reinforced silicon nitride ceramic composite structure, the steps comprising:
   (a) forming a suspension in a carrier liquid of a mixture of particulate materials comprising a colloidal silicon nitride powder, a colloidal sintering aid material and silicon carbide reinforcing whiskers;
   (b) conforming said suspension to a desired configuration and into contact with a semi-permeable membrane;
   (c) retaining said suspension in said configuration while imposing a pressure on said suspension to expel liquid from said suspension through said membrane to arrive at a green composite shaped in said desired configuration and having a density equal to at least 40% of the theoretical density of said composite;
   (d) drying said green composite; and
   (e) thereafter sintering said shaped dried composite under a nitrogen atmosphere at a temperature sufficient to form an intergranular liquid phase in said composite.

18. The method of claim 17 wherein step (c) is carried out to expel liquid from said suspension to arrive at a density equal to at least 45% of theoretical density.

19. The method of claim 17 wherein step (c) is carried out to expel liquid from said suspension to arrive at a density equal to at least 50% of theoretical density.

20. The method of claim 17 wherein step (e) is carried out at a pressure no greater than 1000 psig.

21. The method of claim 20 wherein the pressure imposed on said suspension in step (c) to expel liquid is less than 10,000 psig.

22. The method of claim 17 wherein step (e) is carried out under nitrogen atmosphere at a pressure with the range of 1–200 psig.

23. The method of claim 22 wherein said nitrogen atmosphere is within the range of 100–200 psig.

24. The method of claim 17 wherein said suspension formed in step (a) has a particulate materials content of at least 20 volume %.

25. The method of claim 24 wherein said suspension contains at least 30 volume % of said particulate materials.

26. The method of claim 24 wherein said suspension contains at least 40 volume % of said particulate materials.

27. The method of claim 17 wherein said silicon carbide whiskers are of a diameter of no more than one micron.

28. The method of claim 17 wherein said whiskers have a diameter no greater than the average diameter of said silicon nitride powder and said sintering aid material.

29. The method of claim 17 wherein step (c) is carried out by isostaticly imposing pressure on said suspension.

30. The method of claim 29 wherein said pressure in step (c) of claim 14 is no more than 7,000 psig.

31. The method of claim 30 wherein said sintering step is carried out at a pressure of no more than 1000 psig.

32. The method of claim 31 wherein the concentration of said silicon carbide whiskers in the mixture of particulate materials is no greater than the maximum concentration for the average aspect ratio of said whiskers as indicated by FIG. 1.

33. The method of claim 32 wherein said whiskers have an average aspect ratio of no more than 30.

34. The method of claim 17 wherein said composite has a density at the conclusion of said sintering step of at least 90% of theoretical density.

35. The method of claim 17 wherein said composite has a density at the conclusion of said sintering step of at least 93% of theoretical density.

36. The method of claim 35 further comprising the step of subjecting the sintered composite to hot isostatic pressing at a pressure substantially greater than the pressure at which said sintering step is carried out.

37. The method of claim 36 wherein said sintering step is carried out at a pressure no greater than 1000 psig and said hot isostatic pressing step is carried out at a pressure of at least 10,000 psig.

38. In method for producing a silicon carbide reinforced silicon nitride ceramic composite structure, the steps comprising:
   (a) forming a suspension in a carrier liquid of particulate materials comprising colloidal silicon nitride powder, colloidal sintering aid material, and silicon carbide reinforcing whiskers;
   (b) conforming said suspension to a desired configuration and expelling liquid from said configuration under an applied pressure less than 5000 psig to arrive at a green composite shaped in said configuration; and
   (c) thereafter sintering said dried composite under a nitrogen atmosphere less than 200 psig at a temperature sufficient to form an intergranular liquid phase in said composite and in the presence of an ambient buffer material containing silicon nitride, a particulate sintering aid material and boron nitride.

39. The method of claim 38 wherein said sintering aid material in said suspension is less than the amount of said silicon nitride ceramic powder in said suspension and wherein the sintering aid material in the buffer is less than the amount of the silicon nitride in said buffer.

40. The method of claim 38 wherein said liquid is expelled from said mixture by imposing a pressure upon said mixture in said desired configuration to remove filtrate through a filter structure having a pore size sufficient to retain said particulate materials.

41. The method of claim 40 wherein said liquid is expelled from said suspension by isostatically imposing pressure on said suspension.

* * * * *